United States Patent Office 2,764,478
Patented Sept. 25, 1956

2,764,478
WEED CONTROL COMPOSITION AND METHOD

Norman E. Searle, Wilmington, Del., assignor to E. I. du Pont de Nemours and Company, Wilmington, Del., a corporation of Delaware No Drawing. Application December 28, 1954,
Serial No. 478,207

10 Claims. (Cl. 71—2.6)

This invention relates to herbicidal compositions and methods employing as an essential active ingredient one or more tri-substituted ureas represented by the formula (1) 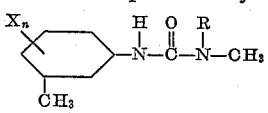

where X is halogen and preferably chlorine or bromine; $n$ is a positive integer up to two (i. e., one or two); and R is an aliphatic hydrocarbon of 1 to 4 carbon atoms and is attached to the ureido nitrogen thru a saturated carbon atom. The compounds are still further characterized in that the aromatic substituent (i. e., the substituent containing the benzene nucleus) has hydrogen on at least one of the nuclear carbons ortho to the nuclear carbon to which the urea nitrogen atom is linked. In other words, at least one of the ortho positions is unsubstituted.

The tri-substituted ureas employed in the herbicidal compositions and methods of this invention are suitably prepared, for example, by reaction of an N-halo-m-tolyl-carbamyl chloride with an appropriate secondary aliphatic amine such as dimethylamine. The process is illustrated by the following equation but it will be understood that by suitable choice of the carbamyl chloride reactant and the secondary amine that other tri-substituted ureas are similarly prepared (2) 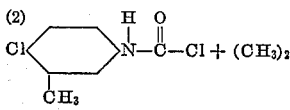

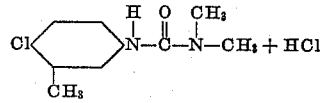

The carbamyl chloride-amine reaction is most readily carried out in the presence of an inert solvent such as dioxane, ethyl ether, or anisole. The reaction proceeds more rapidly at somewhat elevated temperatures say at the reflux temperature of the reaction medium. No catalyst is needed.

Illustrative of the tri-substituted ureas employed in the compositions and methods of the invention are:

3-(4-bromo-m-tolyl)-1,1-dimethylurea
3-(2,4-dichloro-3-methylphenyl)-1,1-dimethylurea
3-(4-chloro-m-tolyl)-1,1-dimethylurea
3-(4-chloro-m-tolyl)-1-methyl-1-ethylurea
3-(4-chloro-m-tolyl)-1-methyl-1-isopropylurea
3-(4-iodo-m-tolyl)-1,1-dimethylurea
3-(4-chloro-m-tolyl)-1-methyl-1-n-butylurea
3-(4-chloro-m-tolyl)-1-methyl-1-sec. butylurea
3-(2,4-dichloro-5-methylphenyl)-1,1-dimethylurea
3-(4-bromo-m-tolyl)-1-methyl-1-butylurea
3-(4-chloro-m-tolyl)-1-methyl-1-n-propylurea The herbicidal compositions of the invention are prepared by admixing one or more of the tri-substituted ureas with a carrier material or conditioning agent of the kind used and referred to in the art as a pest control adjuvant or modifier in order to provide formulations adapted for ready and efficient application to soil, weeds, or unwanted plants using conventional applicator equipment.

Thus the tri-substituted urea material is admixed with carrier or adjuvant materials to provide formulations in liquid or solid form. Solid compositions are preferably in the form of dusts and are compounded to give homogeneous free-flowing dusts by admixing the active compound with finely divided solids preferably talcs, natural clays, pyrophylllite, diatomaceous earth, and flours such as walnut shell, wheat, redwood, soya bean, cottonseed flours, and other inert solid carries of the kind conventionally employed in preparing pest control compositions and dusts or powdered form.

Liquid compositions employing the active ingredients are prepared in the usual way by admixing the active ingredient with a conventional liquid diluent media. The tri-substituted ureas are quite insoluble in most liquids altho solutions containing them at low concentration can be made if desired using various of the common organic solvents such as cyclohexanol, acetone, ethanol, isobutanol, furfural, isopropyl actate, and the like. More preferably, the liquid compositions are prepared in more concentrated form so that the liquid composition is primarily a suspension of the active compound in the liquid. In preparing such compositions conventional spray oils, alkylated naphthalene, or fats, or similar vehicles such as cottonseed oil, olive oil, lard, paraffin oil, hydrogenated vegetable oil and similar conventional organic liquid diluents are suitably employed.

The herbicidal compositions of the invention whether in the form of dusts or liquids preferably also include a surface active dispersing agent of the kind sometimes referred to in the art as wetting, dispersing, and emulsifying agents.

The surface active dispersing agents employed can be of the anionic, cationic, or nonionic type and include, for example, sodium oleate, sulfonated petroleum oils, sodium lauryl sulfate, polyethylene oxides, and other surface active dispersing agents such as those listed in detail in articles by McCutcheon in Soap and Sanitary Chemicals, August, September, and October of 1949.

The amount of surface active dispersing agent employed in compositions of the invention will vary depending upon the effectiveness of the particular surface active dispersing agent employed and the properties of other materials in the composition. Generally, the surface active dispersing agent will not comprise more than about 10% by weight of the composition and with the better materials will be 5% or less.

The content of the active tri-substituted urea or ureas employed in the herbicidal compositions of the invention will vary according to the manner in which and the purpose for which the composition is to be applied but in general will be from 0.5 to 95% by weight of the composition.

The herbicidal compositions are applied either as a spray or in the form of a dust to the locus or area to be protected from undesirable plant growth. The tri-substituted urea is, of course, applied in amount sufficient to exert the desired plant killing action. The application can be made directly upon the locus or area during the period of infestation of unwanted plant growth or alternatively the application can be made in advance of an anticipated infestation. Compositions of the invention are especially effective at low dosages or rates of application for the control of weed seedlings.

Fertilizer materials, other herbicidal agents, and other pest control agents such as insecticides and fungicides can be included in the herbicidal compositions of the invention if desired.

In order that the invention may be better understood, the following examples are given in addition to the examples already given above.

*Example 1*

To 6 parts by weight of phosgene in 50 parts by weight of xylene, there was added a solution of 8 parts by weight of 4-chloro-m-toluidine in 37 parts by weight of xylene.

The mixture was refluxed for one hour and thereafter was refluxed vigorously for two hours while driving off hydrogen chloride.

Nitrogen was bubbed thru the reaction mixture to remove the last traces of hydrogen chloride and the resulting solution was then mixed with an excess of gaseous dimethylamine. Crude solid 3-(4-chloro-m-tolyl)-1,1-dimethylurea separated upon cooling and was recrystallized from toluene to give 7.9 parts by weight of product of melting point 146–8° C.

*Analysis.*—Calc'd. for N: 13.18. Found: 13.02.

The compound prepared above is formulated as a water dispersible powder by mixing and grinding it with conditioning agents of the kind and in the proportions by weight shown below.

3-(4-chloro-m-tolyl)-1,1-dimethylurea _____ 80
Bentonite _____ 18
Sodium disulfonate of dibutyl phenylphenol _____ 2

*Example 2*

A solution of 24.2 parts by weight of 4-bromo-m-toluidine and 13 parts by weight of triethylamine in 100 parts by weight of anisole was added slowly with stirring to a solution of 13 parts by weight phosgene in 75 parts by weight anisole. The resulting mixture was refluxed for 15 minutes, cooled to room temperature, and then there was added thereto 13 parts by weight triethylamine and 7 parts by weight dimethylamine.

The mixture was refluxed for 10 minutes, then filtered while hot to remove triethylamine hydrochloride which had precipitated. The filtrate was cooled to 20° C. whereupon 3 - (4-bromo-m-tolyl)-1,1-dimethylurea precipitated.

The tri-substituted product was filtered, washed first with dilute hydrochloric acid, then with water. Upon recrystallization from toluene, there was obtained 18 parts by weight of the 3-(4-bromo-m-tolyl)-1,1-dimethylurea, M. P. 153.5–154° C.

*Analysis.*—Calc'd.: N, 10.89; Br, 31.21. Found: N. 10.93; Br, 31.65.

The following formulation made with the compound of the above process is adapted for direct application as a dust for the destruction or prevention of weeds using conventional dusting equipment. The dust is made by blending or mixing the ingredients and grinding the mix to give a composition having an average particle size less than about 50 microns 3-(4-bromo-m-tolyl)-1,1-dimethylurea _____ 20
Talc _____ 80

*Example 3*

The following powdered composition is adapted for use in the preparation of a spray composition using either an oil, water, or a combination of oil and water as the liquid diluent. The powder is made by mixing and grinding as in the case of the powder of Example 2.

3-(4-chloro-m-tolyl)-1-methyl-1-isopropylurea _____ 70
Alkylated aryl polyether alcohol (surface active agent) _____ 4
Fuller's earth _____ 26

*Example 4*

The following composition is in a liquid form and is adapted for addition to water to give an aqueous dispersion for application as a spray. The tri-substituted urea herbicides are generally quite insoluble in most oils. Therefore, the liquid compositions such as the composition of this example ordinarily are not complete solutions but rather are dispersions of solid in an oil. The liquid or fluid composition shown is prepared by thoroughly mixing and dispersing the active compound and conditioning agent or agents in an organic liquid diluent.

3-(4-chloro-m-tolyl)-1-methyl-1-n-butylurea _____ 25
Long chain fatty alcohol sulfate (surface active agent) _____ 2
Goulac (surface active agent) _____ 3
Kerosene _____ 70

*Example 5*

The following composition is adapted for application by means of a fertilizer spreader apparatus or similar equipment. The composition is readily prepared by mixing the ingredients with water to form a paste. The paste is then extruded, dried, and ground to give the desired granular size. Preferably the granules will be in the order of one-thirty second to one-quarter inch diameter.

3-(2,4-dichloro-5-methylphenyl)-1,1-dimethylurea ___ 10
Goulac (surface active agent) _____ 3
Hydrocarbon oil _____ 1
Dextrin (binding agent) _____ 20
Fuller's earth _____ 66

The herbicidal utility of the compositions of the invention is illustrated by the following examples.

*Example 6*

For pre-emergence weed control, a plot seeded with cotton and corn and naturally infested with weed seeds was treated with an aqueous spray of a water dispersible powder containing 3-(4-chloro-m-tolyl)-1,1-dimethylurea as the herbicidal ingredient. The aqueous spray was applied in quantity sufficient to provide a treatment of one pound of the urea compound per acre. Approximately four weeks after the time of application, it was observed that substantially complete control of weed seedlings had been obtained without damage to the corn or the cotton.

*Example 7*

In foliar applications, aqueous dispersions of compositions of the invention were sprayed on three-month old quack grass plants from root cuttings. The spray applications were continued to the run off point. Following this procedure, it was found that 3-(4-chloro-m-tolyl)-1,1-dimethylurea applied at a 1% concentration gave complete kill of the quack grass in three months; and that 3-(4-bromo-m-tolyl)-1,1-dimethylurea applied at a 3% concentration similarly gave complete kill of the quack grass in three months.

*Example 8*

An aqueous dispersion containing 3% by weight of 3-(4-bromo-m-tolyl)-1,1-dimethylurea as the active ingredient sprayed on six-week old Johnson grass seedlings to the run off point gave complete kill of the Johnson grass seedlings in five weeks.

*Example 9*

Three-month old quack grass grown from root sections was cut off just above the ground level. Herbicidal compositions of the invention were then applied to the cut off, or mowed area. At an application rate of 36 pounds per acre of 3-(4-bromo-m-tolyl)-1,1-dimethylurea, it was found that complete kill of all quack grass was obtained within three months. Using 3-(2,4-dichloro-m-tolyl)-1,1-dimethylurea, substantially complete kill of quack grass was obtained within three months at an application rate of 72 pounds per acre of the urea compound.

This application is a continuation-in-part of my co-pending application Serial No. 386,375, filed October 15, 1953, now abandoned.

The foregoing detailed description has been given for clearness of understanding only and no unnecessary limitations are to be understood therefrom. The invention is not limited to the exact details shown and described for obvious modifications will occur to those skilled in the art.

I claim:

1. A method for the control of weeds which comprises applying to a locus to be protected from the weeds, in amount sufficient to exert a herbicidal action, a tri-substituted urea represented by the formula

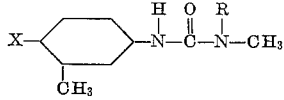

where X is halogen and R is an aliphatic hydrocarbon radical of 1 to 4 carbon atoms and is attached to the ureido nitrogen thru a saturated carbon atom.

2. A herbicidal composition comprising a pest control adjuvant and, in a concentration sufficient to exert a herbicidal action, a tri-substituted urea represented by the formula

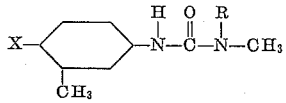

where X is halogen and R is an aliphatic hydrocarbon radical of 1 to 4 carbon atoms and is attached to the ureido nitrogen thru a saturated carbon atom.

3. A method for the control of weeds which comprises applying to a locus to be protected from the weeds, in amount sufficient to exert a herbicidal action, a tri-substituted urea represented by the formula

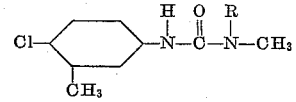

where R is an aliphatic hydrocarbon radical of 1 to 4 carbon atoms and is attached to the ureido nitrogen thru a saturated carbon atom.

4. A herbicidal composition comprising a pest control adjuvant and, in a concentration sufficient to exert a herbicidal action, a tri-substituted urea represented by the formula

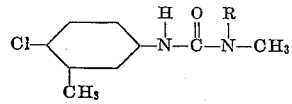

where R is an aliphatic hydrocarbon radical of 1 to 4 carbon atoms and is attached to the ureido nitrogen thru a saturated carbon atom.

5. A method for the control of weeds which comprises applying to a locus to be protected from the weeds, in amount sufficient to exert a herbicidal action, 3-(4-chloro-m-tolyl)-1,1-dimethylurea.

6. A method for the control of weeds which comprises applying to a locus to be protected from the weeds, in amount sufficient to exert a herbicidal action, 3-(4-bromo-m-tolyl)-1,1-dimethylurea.

7. A method for the control of weeds which comprises applying to a locus to be protected from the weeds, in amount sufficient to exert a herbicidal action, 3-(4-chloro-m-tolyl)-1-methyl-1-n-butylurea.

8. A herbicidal composition comprising a pest control adjuvant and, in a concentration sufficient to exert a herbicidal action, 3-(4-chloro-m-tolyl)-1,1-dimethylurea.

9. A herbicidal composition comprising a pest control adjuvant and, in a concentration sufficient to exert a herbicidal action, 3-(4-bromo-m-tolyl)-1,1-dimethylurea.

10. A herbicidal composition comprising a pest control adjuvant and, in a concentration sufficient to exert a herbicidal action, 3-(4-chloro-tolyl)-1-methyl-1-n-butylurea.

References Cited in the file of this patent

UNITED STATES PATENTS

| | | |
|---|---|---|
| 2,655,444 | Todd | Oct. 13, 1953 |
| 2,655,445 | Todd | Oct. 13, 1953 |
| 2,655,446 | Todd | Oct. 13, 1953 |
| 2,705,195 | Cupery et al. | Mar. 29, 1955 |